3,055,881
COLOUR SALTS OF TRIAZENE COMPOUNDS
Jacques Voltz, Basel, and Werner Bossard, Riehen, near Basel, Switzerland, assignors to Geigy Chemical Corporation, Ardsley, N.Y., a corporation of Delaware
No Drawing. Filed June 1, 1959, Ser. No. 817,066
Claims priority, application Switzerland June 4, 1958
7 Claims. (Cl. 260—140)

The present invention concerns water soluble colour salts of triazene compounds, a process for the production thereof, their use for the dyeing of polymeric acrylonitrile and the material fast dyed therewith.

It has been found that quaternary triazene compounds (so-called "diazoamino compounds") having no acid dissociating groups, in which a heterocyclic radical containing nitrogen and an aromatic isocyclic radical are bound to each other by a triazene group, are compounds which are very stable to acid and heat and are valuable dyestuffs for fibrous material made up from polymeric acrylonitrile.

These new dyestuffs are obtained by reacting triazene compounds having no acid dissociating, water solubilising groups of the general Formula I

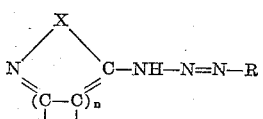 (I)

wherein

X represents a divalent radical which completes the ring containing nitrogen into a heterocyclic 5- or 6-membered ring,
R represents an isocyclic aryl radical which may possibly be substituted,
$Q_1$ and $Q_2$ each represent H, low aliphatic, araliphatic or aromatic groups or, together, they represent an annulated ring, in particular a benzo radical, and
$n$ is 0 or 1, with a compound of the general Formula II $$Y—CH_2—Z \qquad (II)$$

wherein

Y represents the radical of a strong acid and
Z represents hydrogen, a low aliphatic group or a phenyl radical which may possibly be substituted, to form a quaternary colour salt.

The structural Formula I is so to be understood that it embraces not only the triazene compounds shown but also the possible tautomeric ones, in particular also the isomeric form with the NH group in vicinal position to R. The heterocyclic ring containing nitrogen in this formula has, as defined, five or six members, i.e. in practice it is either an azole or an azine ring.

If this nitrogen-containing heterocycle is an azole ring, then the divalent radical X which completes this ring according to the general Formula I is, for example, a propylene radical —CH=CH—CH$_2$, a vinylamino radical —CH=CH—NH—, a vinylthio radical

—CH=CH—S— a vinyloxy radical —CH=CH—O—, or the radicals —CH=N—NH, —N=CH—O—, —N=CH—S, when the index $n=0$. In the above meanings, X completes, according to the general Formula I, an i-pyrrole, pyrazole or imidazole, thiazole, oxazole, 1.2.4-triazole, 1.3.4-oxdiazole and 1.3.4-thiadiazole ring. If X is an o-phenylimino

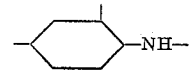

o-phenylthio

or an o-phenoxy radical

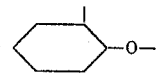

then the hetero ring is thus a benzimidazole, benzthiazole and a benzoxazole ring.

If the nitrogen-containing heterocycle of the general Formula I is an azine ring, then the radical X completing it into a heterocycle is, for example, the butadienylene radical —CH=CH—CH=CH—, the styryl radical bound in o-position to the vinyl group

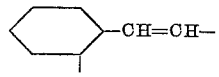

or the propenylimino radical —CH=CH—CH=N—, provided $n$ is 0 in each case. If the index $n$ is 1, then X for example, is the vinylene or the o-phenylene radical. In these meanings, in the first case X completes a pyridine, quinoline and pyrimidine ring bound to the triazene group in the 2-position and in the second case it completes a pyridine and a quinoline ring bound in the 4-position with the triazene group.

The isocyclic aromatic radical R in the general Formula I is principally of the benzene or naphthalene series. Advantageously it is a benzene or substituted benzene radical and, in particular, a benzene radical substituted by electrophilic groups such as halogen, nitro, trifluoromethyl and alkyl or aryl sulphonyl groups.

For the rest, the triazene compounds of the general Formula I can contain the substituents usual in azo-dyestuffs with the exception of acid salt-forming groups such as the sulphonic acid and the carboxyl groups. For example halogen atoms such as fluorine chlorine, bromine and iodine, cyano groups, alkyl, aralkyl and aryl groups, alkoxy and aryloxy groups, alkylated, aralkylated, arylated and acylated amino groups and finally carboxylic and sulphonic acid ester and amide groups can be present.

The triazene compounds used according to the present invention are obtained for example by coupling diazonium compounds of arylamines of the formula R—NH$_2$ with aminoazoles or azines of the Formula III

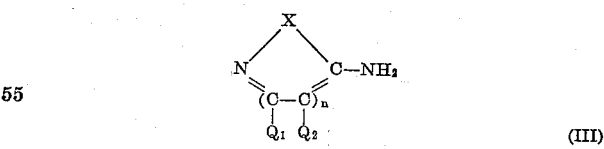 (III)

in an acid to neutral medium.

In this formula, X, $Q_1$, $Q_2$ and $n$ have the meanings given in Formula I. Sometimes the reverse procedure can be followed by coupling the diazonium compound of the aminoazole or aminoazine with the isocyclic arylamine. The greater part of the isocyclic and heterocyclic amines necessary for this purpose are known.

The compounds of the general Formula II, with which the triazene compounds are converted into the quaternary colour salts, are esters of aliphatic or araliphatic hydroxyl compounds with strong acids. In particular, the esters of low molecular alcohols known as alkylating agents such as, for example, esters of methyl, ethyl or benzyl alcohol with halogen hydracids such as chloro, bromo or iodo hydracid or with sulphuric acid or with possibly substituted benzene sulphonic acid, are used. Preferred alkylating agents are dimethyl and diethyl sulphate, also methyl or ethyl bromide or iodide, benzyl chloride or bromide and, finally, p-toluene sulphonic acid methyl or ethyl ester. Advantageously an excess of compound II is used for the reaction and it is performed, if necessary, in an inert organic solvent, reaction temperatures of about 80–150° are indicated; it is often necessary to perform the reaction under pressure.

The process for the production of colour salts according to the present invention is concerned with the simultaneous alkylation of secondary and tertiary amino groups. A modification of the process according to the present invention consists in starting from triazene compounds which are already alkylated at one triazene or ring nitrogen atom, i.e. those which only contain tertiary N atoms, and converting these by means of compounds of the general Formula II into quaternary colour salts. This modification of the process is indicated if it is intended to use the pure N-alkylated triazene compounds which are easily produced from aromatic diazonium compounds and heterocycles containing secondary amino groups.

The alkylation or aralkylation of tautomeric triazene compounds naturally leads to mixtures of isomeric N-alkyl triazene cyclammonium salts. On alkylating the three possible structures of a tautomeric triazene compound of Formula I with the ester $Y-CH_2-Z$, on principle two isomeric N-alkyl triazene cyclammonium salts of the Formulae IV and V are formed:

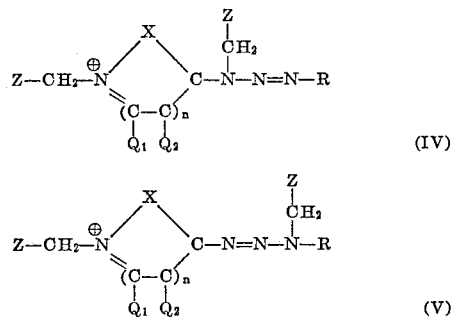

In these and the following formulae, X, Y, Z, $Q_1$, $Q_2$, R and $n$ have the meanings given above. The content of the two isomers IV and V cannot be predicted because the content is influenced not only by the proportion of the three structures in the tautomeric triazene compound, which depends to a great extent on the character and the substitution of the isocyclic- and heterocyclic-aromatic radicals bound to the N atoms of the triazene group, but also by steric influences and reaction conditions. In principle, the ratio of the two isomers can vary between 100%:0% and 0:100%.

Thus the dyestuffs according to the invention correspond to the general Formula VI

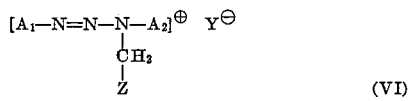

In this formula, of $A_1$ and $A_2$, the one A is a quaternised azine or azole radical of the Formula VII

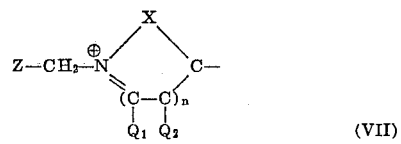

in particular it is a cyclammonium radical substituted aliphatically, or araliphatically, advantageously low aliphatically or by a benzyl group, at the ring nitrogen atom, which radical is from the group of pyridyl, benzopyridyl, thiazolyl, thiadiazolyl, oxidazolyl, benzothiazolyl, naphthothiazolyl, benzopyrazolyl and benzimidazolyl cyclammonium radicals. The 5-membered hetero rings are thus bound to the triazene group by a ring carbon atom in a position vicinal to a ring nitrogen atom, and the 6-membered hetero rings are bound to the triazene group by a carbon atom vicinal to a ring nitrogen atom or in the p-position thereto. In a preferred group of dyestuffs according to the invention, the one A is an N-substituted 2-benzthiazolium radical. The other A of $A_1$ and $A_2$ is an isocyclic-aromatic radical having at most two benzene rings which are either condensed or bound direct by means of bridging members. The isocyclic-aromatic radical can be further substituted by nonionogenic substituents, for example, by halogen such as fluorine, bromine, iodine and, in particular, chlorine, by nitro, cyano, carbamyl, carboxylic acid ester, sulphamyl, alkyl or aryl sulphonyl, sulphonic acid aryl ester, low alkyl and alkoxy groups, by low fluoralkyl, phenyl or phenoxy groups. There can be only one substituent or there can be several identical or different substituents. Dyestuffs according to the invention having a negatively substituted phenyl radical are distinguished by particularly good fastness to light. Thus a preferred group of dyestuffs according to the invention contains, for example, a nitrophenyl, dinitrophenyl, mono-, di- or tri-chlorophenyl, a trifluoromethylphenyl, an alkyl sulphonyl phenyl or a phenyl sulphonyl phenyl radical, in which case for example chlorine or methyl groups can be present as additional substituents.

The dyestuffs according to the invention having a positively substituted phenyl radical, for example a phenyl radical substituted by low alkyl groups such as methyl, ethyl, tert. butyl groups, by low alkoxy groups such as methoxy or ethoxy groups, by phenyl and phenoxy groups, are valuable because of their increased stability in hot aqueous neutral to weakly alkaline solution and because of the wider application made possible by this property, e.g. the dyeing of "Acrilan" made by the firm Chemstrand, Decatur, Ala. These dyestuffs having a positively substituted phenyl radical are therefore also a group of preferred deystuffs.

The uncoloured anion $Y^\ominus$ in the dyestuffs according to the invention is of no particular significance for the dyeing properties. Its function corresponds to that of uncoloured cations, for example of alkali metal cations, in sulphonated textile dyestuffs. The anion $Y^\ominus$ is primarily the acid radical of the alkylating agent $Z-CH_2-Y$.

The colour salts produced according to the present invention are precipitated from aqueous reaction solutions by salting out. Because of the good stability of the colour salts, the solvent can be distilled off from organic solutions, also at a raised temperature, either as such or together with steam. The colour salts can be converted into salts of other acids by mass action or, possibly, also by interaction, or they can be combined with certain metal salts, in particular the chlorides of the second subgroup of the periodic system of chemical elements, to form so-called double salts. The new dyestuffs according to the present invention are used advantageously as salts of halogen hydracids, in particular as chlorides, bromides or iodides, or then as zinc chloride double salts, in addition as benzene or toluene sulphonates or, finally, as methyl or ethyl sulphates. In the form of such salts, the new dystuffs dissolve in water with a more or less neutral reaction. They dye fibres of polymeric or copolymeric acrylonitrile from a neutral to weakly acid, aqueous bath at a raised temperature in pure yellow to orange shades. That the quaternary diazoamino compounds could be used for dyeing from an acid bath at a raised temperature could not have been foreseen as the usual diazoamino compounds very easily decompose in an acid medium in the warm while splitting the triazene group.

Polyacrylonitrile dyeings, in particular those on Orlon 42 of Du Pont, Wilmington (Delaware), attained with the colour salts according to the present invention are distinguished by very good fastness to light and excellent washing fastness, also by good fastness to ironing and pleating. Particularly fast and strongly coloured Orlon dyeings are obtained with those colour salts in which the nitrogen-containing heterocyclic ring is a possibly substituted benzthiazole ring. The new dyestuffs also have the valuable property that on dyeing mixed fabrics made up from polyacrylonitrile and wool, the latter is almost completely reserved.

Further details with regard to the production and use of the colour salts according to the present invention can be seen from the following examples. In the examples the temperatures are in degrees centigrade and the parts are given as parts by weight. The relationship of parts by weight to parts by volume is as that of grammes to cubic centimetres.

Example 1

A diazo solution prepared in the usual manner from 13.8 parts of p-nitraniline, 150 parts of water, 30 parts of concentrated hydrochloric acid and 100 parts of 1 N-sodium nitrite solution is poured while stirring well into a mixture of 15.0 parts of 2-aminobenzthiazole, 100 parts of glacial acetic acid and 300 parts of finely crushed ice. This solution is carefully neutralised with caustic soda lye while cooling well so that the pH of the reaction mixture is finally about 7–7.5. After stirring for a considerable time at 0–5°, the precipitated yellow triazene compound is filtered off under suction, washed and dried. In a mixture of acetone/ethyl Cellosolve 1:1, this product has an absorption maximum of 406 mu (measured in a General Electric recording spectrophotometer).

A suspension of 3.0 parts of this 1.3-[benzthiazolyl-(2)-p-nitrophenyl]-triazene in 10 parts of dimethyl sulphate is heated for 5 minutes at 95–100°. The melt is taken up while warm in 250 parts of warm water, the solution is buffered with sodium acetate until it has an acetic acid reaction and, after the addition of a little animal charcoal, it is filtered. The yellow colour salt is precipitated with zinc chloride and sodium chloride in the form of the zinc chloride double salt.

The dyestuff dissolves in concentrated sulphuric acid and in water with a yellow colour. Its absorption maximum in water is 410 mu.

Dyestuffs having similar properties are obtained if as diazo component, instead of 13.8 parts of 4-nitraniline, the same amount of 3- or 2-nitraniline, 18.3 parts of 2.4-dinitraniline, 15 parts of 4-acetaminoaniline, 12.3 parts of 4-methoxyaniline, 12.7 parts of 4-chloraniline, 12.7 parts of 3- or 2-chloraniline, 16.2 parts of 3.4-dichloraniline, 2.4-dichloraniline or of 2.5-dichloraniline, 19.7 parts of 2.4.6-trichloraniline, 17.2 parts of 4-bromaniline, 25.1 parts of dibromaniline, 17.1 parts of 4-methyl sulphone aniline, 23.3 parts of 4-phenyl sulphone aniline, 11.8 parts of 3-cyananiline or 16.1 parts of trifluoromethyl aniline are used and otherwise the procedure described above is followed.

On dyeing polyacrylonitrile fibres with the water soluble colour salts produced above, the following procedure is followed:

0.5 part of the dyestuff obtained according to Example 1 is pasted with 0.5 part of 80% acetic acid and dissolved by the addition of 4000 parts of hot water. One further part of 80% acetic acid, 2 parts of sodium acetate and 4 parts of a condensation product from olefin alcohol and 15 mols of ethylene oxide are added and 100 parts of "Orlon 42" (Du Pont, Wilmington, Delaware, U.S.A.) are entered. The bath is heated within 30 minutes to 90°, kept for 10 minutes at this temperature and then dyeing is performed at the boil for 1 hour. The dyebath is almost completely exhausted. The goods so treated are then soaped for 15 minutes at 80° in 5000 parts of water with the addition of a sulphonated fatty acid condensation product, rinsed and dried. The polyacrylonitrile fibre is dyed in pure yellow shades which have excellent fastness to washing and light.

Example 2

The triazene compound from 18 parts of 2-amino-6-methoxy-benzthiazole and the diazonium compound from 9.3 parts of aniline is obtained analogously to Example 1. 2.8 parts of this triazene compound are pasted with 10 parts of dimethyl sulphate in 50 parts of dioxan. The suspension is then heated for 30 minutes at 100–110° and then the still warm reaction mixture is poured into 1000 parts of water. The yellow solution is clarified and the colour salt is precipitated with zinc chloride and sodium chloride.

The dyestuff dissolves in concentrated sulphuric acid and in water with a yellow colour.

Similar colour salts are obtained on using 4-methyl-, 3-methyl- and 2-methyl-aniline, 4-phenyl aniline, 4-phenoxy aniline, 1-amino- or 2-amino-naphthalene instead of aniline. The water soluble colour salt obtained with 4-phenyl aniline has an absorption maximum in aqueous solution of 427 mu.

On dyeing polyacrylonitrile fibres with the water soluble colour salts obtained according to the above example, the following procedure is followed:

0.5 part of the dyestuff obtained according to Example 2 is pasted with 0.5 part of 80% acetic acid and dissolved by the addition of 4000 parts of hot water. One further part of 80% acetic acid, 2 parts of sodium acetate and 4 parts of a condensation product from olein alcohol and 15 mols of ethylene oxide are added and 100 parts of "Acrilan" (Messrs. Chemstrand, Decatur, Ala., U.S.A.) are entered. The bath is heated within 30 minutes to 90°, kept at this temperature for 10 minutes and then dyeing is performed at the boil for 1 hour. The dyebath is almost completely exhausted. The goods so treated are then soaped for 15 minutes at 80° in 5000 parts of water with the addition of a sulphonated fatty acid condensation product, rinsed and dried. The polyacrylonitrile fibre is dyed in pure yellow shades which have excellent fastness to washing and light.

Example 3

The triazene compound from 18 parts of 2-amino-6-methoxy-benzthiazole and the diazo compound from 13.8 parts of p-nitraniline is produced analogously to Example 1. The same product can also be obtained by coupling the diazonium salt from 18 parts of 2-amino-6-methoxy-benzthiazole with 13.8 parts of p-nitraniline. In a mixture of acetone/ethyl Cellosolve, the triazene compound obtained has an absorption maximum of 419 mu. A paste of 3.3 parts of this 1.3-[6-methoxy-benzthiazolyl-(2)-4-nitrophenyl]-triazene in 10 parts of diethyl sulphate is heated for 10 minutes at 100°. The reaction mixture is dissolved in 500 parts of warm water, the pH of the solution is adjusted to 6 with sodium acetate and, after the addition of a little animal charcoal, it is filtered. The product is further worked up as described in Example 1.

The dyestuff dissolves in concentrated sulphuric acid and in water with a yellow colour and in aqueous solution has an absorption maximum of 400 mu. On methylating with 10 parts of dimethyl sulphate, a colour salt having an absorption maximum in aqueous solution of 432 mu is obtained.

Similar dyestuffs are obtained by replacing the p-nitraniline in the above example by o- or m-nitraniline. Also, instead of 2-amino-6-methoxy-benzthiazole as coupling component, an equivalent amount of 2-amino-6 - methyl - benzthiazole, 2 - amino - chlorobenzthiazole, 2-amino-5-methoxy-benzthiazole, 2-amino-5-chlorobenzthiazole or of 2-amino-4.5:2'.1'-naphthothiazole can be used. All of these starting dyestuffs can also be methylated with dimethyl sulphate whereupon valuable basic dyestuffs are obtained in corresponding shades.

On dyeing polyacrylonitrile fibres with the water soluble colour salts produced in the above example, the following procedure is followed:

0.5 part of the dyestuff obtained according to Example 3 is pasted with 0.5 part of 80% acetice acid and dissolved by the addition of 4000 parts of hot water. One further part of 80% acetic acid, 2 parts of sodium acetate and 4 parts of a condensation product from olein alcohol and 15 mols of ethylene oxide are added and 100 parts of "Redon" (Messrs. Phrix, Hamburg, Germany) are entered. The bath is heated within 30 minutes to 90°, kept for 10 minutes at this temperature and then dyeing is performed at the boil for 1 hour. The dyebath is almost completely exhausted. The goods so treated are then soaped for 15 minutes at 80° in 5000 parts of water with the addition of a sulphonated fatty acid condensation product, rinsed and dried. The polyacrylonitrile fibre is dyed in pure yellow shades which have excellent fastness to washing and light.

*Example 4*

The triazene compound from 20.7 parts of 2-amino-6-acetamino-benzthiazole and the diazo compound from 13.8 parts of p-nitraniline is obtained analogously to Example 1. In a mixture with acetone/ethyl Cellosolve 1:1 this product has an absorption maximum of 420 mu.

A solution of 3.6 parts of this 1.3-[acetamino-benzthiazolyl-(2)-p-nitrophenyl]-triazene in 150 parts of chlorobenzene and 4.0 parts of dimethyl sulphate is heated for 30 minutes at 100–110° whereupon the yellow colour salt begins to precipitate. After cooling the reaction mass the dyestuff obtained is filtered off. It is further purified by dissolving in 250 parts of hot water and precipitated from the solution, which has been clarified with a little animal charcoal, with sodium chloride.

The dyestuff dissolves in concentrated sulphuric acid with a yellow and in water with a yellow-orange colour and in aqueous solution has an absorption maximum of 424 mu. It dyes polyacrylonitrile fibres from an acetic acid bath in vivid orange shades. The bath is almost completely exhausted.

Dyestuffs having similar properties are obtained if, instead of p-nitraniline as diazo component, the same number of parts of m- or o-nitraniline, 10.7 parts of 4-methyl aniline, 12.7 parts of 2-, 3- or 4-chloraniline, 16.2 parts of 3.4-dichloraniline, 17.1 parts of p-methyl sulphonyl aniline or 14.3 parts of 2-aminonaphthalene are used and otherwise the same procedure is followed.

The following procedure is adopted on dyeing polyacrylonitrile fibres with the water soluble colour salts obtained according to the above example.

0.5 part of the dyestuff obtained according to Example 4 is pasted with 0.5 part of 80% acetic acid and dissolved by the addition of 4000 parts of hot water. One further part of 80% acetic acid, 2 parts of sodium acetate and 4 parts of a condensation product from olein alcohol and 15 mols of ethylene oxide are added and 100 parts of "Dralon" (Bayer, Leverkusen, Germany) are entered. The bath is heated within 30 minutes to 90°, kept for 10 minutes at this temperature and then dyeing is performed at the boil for 1 hour. The dyebath is almost completely exhausted. The goods so treated are then soaped for 15 minutes at 80° in 5000 parts of water with the addition of a sulphonated fatty acid condensation product, rinsed and dried. The polyacrylonitrile fibre is dyed in pure orange shades which have excellent fastness to washing and light.

*Example 5*

17.1 parts of p-methyl sulphonyl aniline in 100 parts of water and 30 parts of concentrated hydrochloric acid are diazotised in the usual way with 6.9 parts of sodium nitrite. The diazo solution is buffered and, when the solution is acetic acid to neutral, it is coupled with 16.4 parts of 2-imino-3-methyl-benzthiazoline to form the corresponding diazoamino compound.

3.5 parts of this 1.3-[3-methyl-2.3-dihydro-benzthiazolylidene-(2)-p-methyl sulphonyl phenyl]-triazene are heated with excess methyl iodide for 1 hour under pressure at 120°. The crude reaction product is further purified by dissolving in 250 parts of hot water, the solution is clarified with a little animal charcoal and the colour salt is finally precipitated with sodium iodide. A similar product is obtained with ethyl iodide instead of methyl iodide.

These two new dyestuffs dissolved in water and in concentrated sulphuric acid with a yellow colour and dye polyacrylonitrile fibres from an acetic acid bath in yellow shades which are very fast to light.

Analogously formed colour salts are obtained on treating the diazoamino compound with benzyl bromide, p-toluene sulphonic acid methyl ester, p-toluene sulphonic acid ethyl ester, p-toluene sulphonic acid-n-butyl ester or p-toluene sulphonic acid-chlorethyl ester.

The following procedure is adopted on dyeing polyacrylonitrile fibres with the water soluble colour salts obtained according to the above example.

0.5 part of the dyestuff obtained according to Example 5 is pasted with 0.5 part of 80% acetic acid and dissolved by the addition of 4000 parts of hot water. One further part of 80% acetic acid, 2 parts of sodium acetate and 4 parts of a condensation product from olein alcohol and 15 mols of ethylene oxide are added and 100 parts of "Courtelle" (Courtaulds, Coventry, England) are entered. The bath is heated within 30 minutes to 90°, kept for 10 minutes at this temperature and then dyeing is performed at the boil for 1 hour. The dyebath is almost completely exhausted. The goods so treated are then soaped for 15 minutes at 80° in 5000 parts of water with the addition of a sulphonated fatty acid condensation product, rinsed and dried. The polyacrylonitrile fibre is dyed in pure yellow shades which have excellent fastness to washing and light.

*Example 6*

13.8 parts of p-nitraniline in 100 parts of water and 30 parts of concentrated hydrochloric acid are diazotised in the usual way with 100 parts of 1 N-sodium nitrite solution. The diazo solution obtained is poured into a solution of 10 parts of 2-aminothiazole in 100 parts of glacial acetic acid and 300 parts of ice and the reaction mixture is then neutralised with caustic soda lye. After stirring for a considerable time at 0–5°, the yellow diazo-amino dyestuff is filtered off under suction, washed and dried.

2.8 parts of this 1.3-[thiazolyl-(2)-p-nitrophenyl]-triazene is heated for 5 minutes in 10 parts of dimethyl sulphate and the melt is worked up as described in Example 1.

The colour salt dissolves in water and in concentrated sulphuric acid with a yellow colour. It dyes polyacrylonitrile fibres from an acetic acid solution, which is almost completely exhausted, in yellow shades which have excellent fastness properties.

Dyestuffs having similar properties are obtained by using equivalent amounts of 2-amino-4-methoxy-thiazole (13.0 parts), 11.4 parts of 2-amino-4-methyl thiazole, 17.6 parts of 2-amino-4-phenyl thiazole, 12.8 parts of 2-amino-4.5-dimethyl thiazole, 14.2 parts of 2-amino-4-methyl-5-ethyl thiazole, or 25.2 parts of 2-amino-4.5-diphenyl thiazole. Instead of 2-amino thiazole derivatives, also 2-amino thiadiazole (10.1 parts) or 2-amino-5-methyl-thiadiazole (11.5 parts) can be used.

The following procedure is followed on dyeing polyacrylonitrile fibres with the water soluble colour salts obtained according to the above example:

0.5 part of the dyestuff obtained according to Example 6 is pasted with 0.5 part of 80% acetic acid and dissolved by the addition of 4000 parts of hot water. One further part of 80% acetic acid, 2 parts of sodium acetate and 4 parts of a condensation product from olein alcohol and 15 mols of ethylene oxide are added and 100 parts of "Crylor" (Rhodiaceta, Lyons, France)

are entered. The bath is heated within 30 minutes to 90°, kept for 10 minutes at this temperature and then dyeing is performed at the boil for 1 hour. The dyebath is almost completely exhausted. The goods so treated are then soaped for 15 minutes at 80° in 500 parts of water with the addition of a sulphonated fatty acid condensation product, rinsed and dried. The polyacrylonitrile fibers are dyed in pure yellow shades which have excellent fastness to washing and light.

*Example 7*

13.8 parts of p-nitraniline are diazotised in the usual way. The diazo solution is poured into a solution of 10.8 parts of 1-methyl-2-imino-1.2-dihydropyridine in 300 parts of ice water which has been acidified with hydrochloric acid. The solution is gradually neutralised with caustic soda lye and, after stirring for a considerable time, the triazene compound is filtered off under suction, washed and dried.

2.4 parts of the 1-[1'-methyl-pyridyl-(2')]-3-p-nitrophenyl-triazene so obtained are converted into the corresponding colour salt with methyl iodide as described in Example 4 and the colour salt is worked up as described in that example.

The colour salt so obtained dissolved in concentrated sulphuric acid and in water with a yellow colour, and dyes polyacrylonitrile fibres in pure yellow shades. If instead of 1-methyl-2-imino-1.2-dihydropyridine, 1-methyl-4-imino-1.4-dihydropyridine, 1 - methyl-2-imino-1.2-dihydroquinoline or 1-imino-2-methyl-1.2-dihydro-isoquinoline is used, products having similar properties are obtained.

On dyeing polyacrylonitrile fibres with the dyestuffs produced according to the above example, the following procedure is followed:

0.5 part of the dyestuff obtained according to Example 7 is pasted with 0.5 part of 80% acetic acid and dissolved by the addition of 4000 parts of hot water. One further part of 80% acetic acid, 2 parts of sodium acetate and 4 parts of a condensation product from olein alcohol and 15 mols of ethylene oxide are added and 100 parts of "Nymcrylon" (Nyma, Nijmwegen, Holland) are entered. The bath is heated within 30 minutes to 90°, kept for 10 minutes at this temperature and then dyeing is performed at the boil for 1 hour. The dyebath is almost completely exhausted. The goods so treated are then soaped for 15 minutes at 80° in 5000 parts of water with the addition of a sulphonated fatty acid condensation product, rinsed and dried. The polyacrylonitrile fibres are dyed in pure yellow shades which have outstanding fastness to washing and light.

*Example 8*

6.0 parts of the diazoamino compound from diazotised p-nitraniline and 2-aminobenzthiazole described in Example 1 are boiled for 30 minutes while stirring with 3.6 parts of potassium carbonate in 100 parts of ethyl methyl ketone. A solution of 2.7 parts of dimethyl sulphate in 20 parts of ethyl methyl ketone is then added dropwise and the whole is kept for another 30 minutes at the boil. After cooling, the reaction mixture is poured into 3000 parts of water. The precipitate is filtered off and washed with water until the filtrate has a neutral reaction.

3.1 parts of the monoalkylation product so obtained is heated in 10 parts of dimethyl sulphate for 5 minutes at 95–100° and the melt is then worked up as described in Example 1.

The yellow dyestuff obtained is identical with the product described in Example 1.

*Example 9*

A diazonium salt solution produced in the usual way from 12.7 parts of p-chloraniline and sodium nitrite is poured into a hydrochloric acid solution of 16.1 parts of 1.3-dimethyl-2.3-dihydrobenzimidazole. The reaction solution is carefully neutralised. After stirring for a considerable time, the yellow triazene compound is filtered off under suction, washed and dried.

3.1 parts of the triazene compound obtained are methylated with 4.2 parts of dimethyl sulphate according to the process described in Example 1 and the reaction mixture is worked up as described in that example. The colour salt obtained dissolves in water with a greenish yellow colour and dyes polyacrylonitrile fibres in pure yellow shades. Similar colour salts are obtained on using an equivalent amount of the mononitranilines instead of the 4-chloraniline. Dyestuffs having similar properties are obtained by methylating the triazene compounds produced by coupling the diazonium salts from 12.7 parts of m- or p-nitraniline with 13.3 parts of 3-aminoindazole.

The following procedure is adopted on dyeing polyacrylonitrile fibres with the water soluble colour salts produced according to the above example:

0.5 part of the dyestuff obtained according to Example 9 is pasted with 0.5 part of 80% acetic acid and dissolved by the addition of 4000 parts of hot water. One further part of 80% acetic acid, 2 parts of sodium acetate and 4 parts of a condensation product from olein alcohol and 15 mols of ethylene oxide are added and 100 parts of "Pan" (Bayer, Leverkusen, Germany) are entered. The bath is heated within 30 minutes to 90°, kept for 10 minutes at this temperature and then dyeing is performed at the boil for 1 hour. The dyebath is almost completely exhausted. The goods so treated are then soaped for 15 minutes at 80° in 5000 parts of water with the addition of a sulphonated fatty acid condensation product, rinsed and dried. The polyacrylonitrile fibre is dyed in pure yellow shades which have excellent fastness to washing and light.

What we claim is:

1. A dye, free from acid salt-forming groups, of the general formula

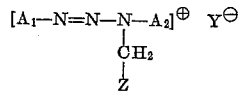

wherein the one of $A_1$ and $A_2$ represents an N-lower aliphatic and N-benzyl substituted cyclammonium radical selected from the group consisting of pyridyl, benzopyridyl, thiazolyl, thiadiazolyl, oxadiazolyl, benzothiazolyl, naphthothiazolyl, benzopyrazolyl and benzimidazolyl cyclammonium radicals, the pyridyl and benzopyridyl radicals being bound to the triazene group by a carbon atom in one of the positions vicinal and para to ring hetero nitrogen, and the remaining radicals being bound to the triazene group by a carbon atom in a position vicinal to ring hetero nitrogen, and the other of $A_1$ and $A_2$ represents a member selected from the group consisting of unsubstituted isocyclic aromatic radicals having at most two benzene nuclei and non-ionogenically substituted isocyclic aromatic radicals having at most two benzene nuclei, Z means a member selected from the group consisting of H, lower aliphatic and phenyl radicals, and Y means an uncolored anion.

2. A dye of the formula

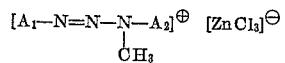

wherein one of $A_1$ and $A_2$ means the 3-methyl-6-methoxy-2-benzthiazolium radical and the other of $A_1$ and $A_2$ means the 4-nitrophenyl radical.

3. A dye of the formula

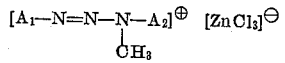

wherein one of $A_1$ and $A_2$ means the 3-ethyl-6-methoxy- 2-benzothiazolium radical and the other of $A_1$ and $A_2$ means the 4-nitrophenyl radical.

4. A dye of the formula

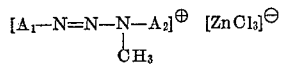

wherein one of $A_1$ and $A_2$ means the 3-methyl-2-benzothiazolium radical and the other of $A_1$ and $A_2$ means the 4-nitrophenyl radical.

5. A dye of the formula

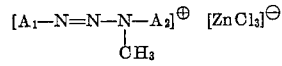

wherein one of $A_1$ and $A_2$ means the 3-methyl-6-acetylamino-2-benzthiazolium radical and the other of $A_1$ and $A_2$ means the 4-methylphenyl radical.

6. A dye of the formula

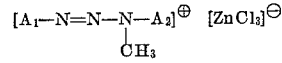

wherein one of $A_1$ and $A_2$ means the 3-methyl-6-acetylamino-2-benzthiazolium radical and the other of $A_1$ and $A_2$ means the 4-nitrophenyl radical.

7. A dye of the formula $$[A_1-N=N-N-A_2]^\oplus \ [ZnCl_3]^\ominus$$
$$\phantom{[A_1-N=N-N}|\phantom{A_2]}$$
$$\phantom{[A_1-N=N-N}CH_3$$

wherein one of $A_1$ and $A_2$ means the 3-methyl-6-methoxy-2-benzthiazolium radical and the other of $A_1$ and $A_2$ means the 4-phenyl-phenyl radical.

References Cited in the file of this patent

UNITED STATES PATENTS

| | | |
|---|---|---|
| 1,982,681 | Markush | Dec. 4, 1934 |
| 2,064,817 | Brun | Dec. 22, 1936 |
| 2,643,990 | Ham | June 30, 1953 |
| 2,746,836 | Rossin | May 22, 1956 |
| 2,766,229 | Hardy et al. | Oct. 9, 1956 |
| 2,781,337 | Moser et al. | Feb. 12, 1957 |
| 2,792,276 | Kaupin et al. | May 14, 1957 |
| 2,815,338 | Ruegg | Dec. 3, 1957 |
| 2,832,764 | Huenig | Apr. 29, 1958 |

OTHER REFERENCES

Colour Index, 2nd Ed., 1956, Society of Dyers and Colourists, vol. 1, page 1623, entry C.I. 11270.
Ibid., vol. 3, page 3018, entry C.I. 11270.